(12) United States Patent
Sako et al.

(10) Patent No.: US 9,185,282 B2
(45) Date of Patent: Nov. 10, 2015

(54) SYSTEM, ELECTRONIC APPARATUS, AND RECORDING MEDIUM

(71) Applicant: Sony Corporation, Tokyo (JP)

(72) Inventors: Yoichiro Sako, Tokyo (JP); Takatoshi Nakamura, Kanagawa (JP); Akira Tange, Tokyo (JP); Ichiro Mayama, Tokyo (JP)

(73) Assignee: SONY CORPORATION, Tokyo (JP)

( * ) Notice: Subject to any disclaimer, the term of this patent is extended or adjusted under 35 U.S.C. 154(b) by 127 days.

(21) Appl. No.: 13/861,666

(22) Filed: Apr. 12, 2013

(65) Prior Publication Data

US 2013/0293727 A1 Nov. 7, 2013

(30) Foreign Application Priority Data

Apr. 27, 2012 (JP) ................. 2012-103447

(51) Int. Cl.
*H04N 5/232* (2006.01)
*G01C 21/20* (2006.01)
*G01C 21/36* (2006.01)

(52) U.S. Cl.
CPC ............... *H04N 5/232* (2013.01); *G01C 21/20* (2013.01); *H04N 5/23206* (2013.01); *G01C 21/3602* (2013.01); *G01C 21/3652* (2013.01)

(58) Field of Classification Search
None
See application file for complete search history.

(56) References Cited

U.S. PATENT DOCUMENTS

| 2002/0142768 | A1 | 10/2002 | Murata et al. |
| 2006/0267331 | A1* | 11/2006 | Tanaka .......................... 280/806 |
| 2007/0233370 | A1* | 10/2007 | Asada ............................ 701/208 |
| 2012/0240720 | A1* | 9/2012 | Nokura et al. ................... 74/552 |

FOREIGN PATENT DOCUMENTS

| JP | 08094374 A * | 4/1996 | ............ G01C 21/00 |
| JP | 2002-286493 A | 10/2002 | |
| JP | 2003-194571 A | 7/2003 | |
| JP | 2007-051872 A | 3/2007 | |
| JP | 2011-075292 A | 4/2011 | |
| WO | WO 2012063165 A1 * | 5/2012 | |

* cited by examiner

Primary Examiner — Lin Ye
Assistant Examiner — Yih-Sien Kao
(74) Attorney, Agent, or Firm — Hazuki International, LLC (57) ABSTRACT

There is provided a system including a housing configured to be grasped by a hand, a determination unit configured to determine whether an object point is present in a vicinity of an electronic apparatus, a recognition unit configured to recognize a relative relationship between the object point and a position of the electronic apparatus when the determination unit has determined that the object point is present in the vicinity, and a stimulation control unit configured to perform control in a manner that a stimulus is provided to a hand in accordance with the recognized relative relationship.

17 Claims, 8 Drawing Sheets

SYSTEM, ELECTRONIC APPARATUS, AND RECORDING MEDIUM

CROSS-REFERENCE TO RELATED APPLICATION

The present application claims priority from Japanese Patent Application No. JP 2012-103447 filed in the Japanese Patent Office on Apr. 27, 2012, the entire content of which is incorporated herein by reference.

BACKGROUND

The present disclosure relates to a system, an electronic apparatus, and a recording medium.

In recent years, navigation technology has been known that has display for navigating a user to a destination in a mobile terminal such as a mobile phone.

For example, a navigation device for an exhibition described in JP 2011-75292A displays navigation information that includes a travelling direction toward a navigation position, based on the current position information and the direction information of the navigation device and the navigation position information read out from a medium such as a pamphlet.

A position display system described in JP 2002-286493A derives, as a route leading to a destination, an optimal route in terms of a user's fate, which is determined as a lucky route in directionology, based on the position information of a portable terminal and the position information of the destination. A portable terminal according to the present system displays the derived optimal route in terms with a user's fate on a display in the form of a letter or a diagram.

A mobile terminal described in JP 2003-194571A calculates a relative direction of a destination according to the direction of the terminal, which is displayed using a display medium.

A route navigation device described in JP 2007-51872A selects a route to a destination in accordance with a user's health condition, and displays an image indicating the selected route to guide the user.

SUMMARY

However, each of the technologies described above navigates a user to a given destination designated by the user with a display device. Nothing is taken into account regarding navigation to a destination that is not designated by a user.

For example, when a famous spot or a recommendable spot that a user has not noticed is in the vicinity of the user, it is not possible that the spot is designated as a destination since the user has not noticed the spot. Accordingly, if the user is automatically navigated to such a spot, utility of the navigation technology is further improved.

Therefore, the present disclosure proposes a system, an electronic apparatus, and a recording medium that are novel and improved, and are capable of having a user notice an object point present in the vicinity of the user.

According to an embodiment of the present disclosure, there is provided a system including a housing configured to be grasped by a hand, a determination unit configured to determine whether an object point is present in a vicinity of an electronic apparatus, a recognition unit configured to recognize a relative relationship between the object point and a position of the electronic apparatus when the determination unit has determined that the object point is present in the vicinity, and a stimulation control unit configured to perform control in a manner that a stimulus is provided to a hand in accordance with the recognized relative relationship.

According to another embodiment of the present disclosure, there is provided an electronic apparatus including a housing configured to be grasped by a hand, a reception unit configured to determine whether an object point is present in a vicinity of the electronic apparatus, and configured to receive, from a server that recognizes a relative relationship between the object point and a position of the electronic apparatus, the relative relationship recognized by the server when determined that the object point is present in the vicinity, and a stimulation control unit configured to perform control in a manner that a stimulus is provided to a hand in accordance with the relative relationship received by the reception unit.

According to the embodiment of the present disclosure, there is provided a recording medium having a program recorded thereon, the program causing a computer to execute the processes of determining whether an object point is present in a vicinity of an electronic apparatus including a housing that is grasped by a hand, receiving, from a server that recognizes a relative relationship between the object point and a position of the electronic apparatus, the relative relationship recognized by the server when determined that the object point is present in the vicinity, and performing control in accordance with the received relative relationship in a manner that a stimulus is provided to a hand.

According to the embodiments of the present disclosure described above, it is possible to have a user notice an object point that is present in the vicinity.

DETAILED DESCRIPTION OF THE EMBODIMENT(S)

Hereinafter, preferred embodiments of the present disclosure will be described in detail with reference to the appended drawings. Note that, in this specification and the appended drawings, structural elements that have substantially the same function and structure are denoted with the same reference numerals, and repeated explanation of these structural elements is omitted.

Embodiments will be described in the following order.
1. Overview of Object Recognition System According to Embodiment of Present Disclosure
2. Basic Configurations
2-1. Configuration of Digital Camera
2-2. Configuration of Server
3. Operation Process
4. Conclusion

1. OVERVIEW OF OBJECT RECOGNITION SYSTEM ACCORDING TO EMBODIMENT OF PRESENT DISCLOSURE

Figure 1:
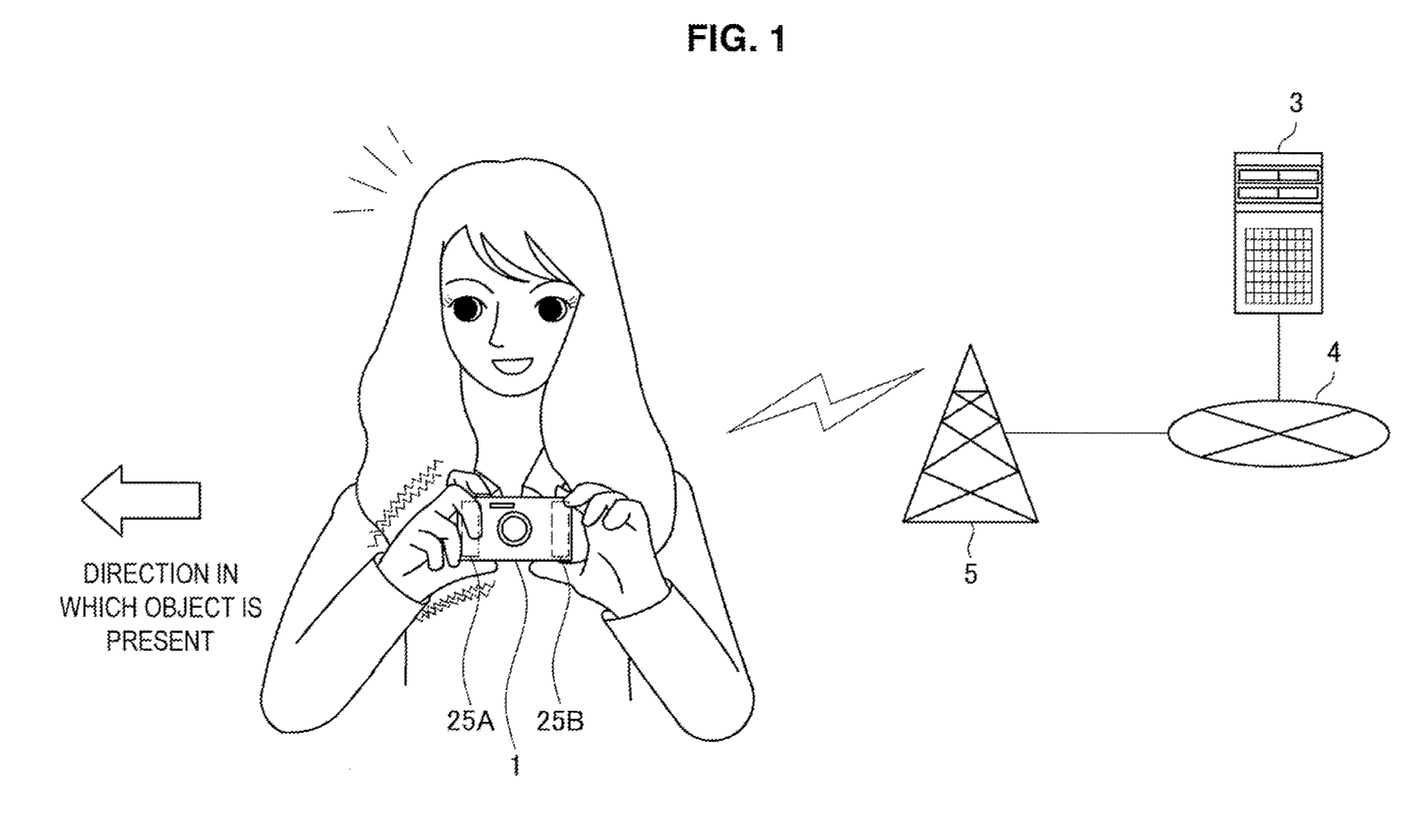
FIG. 1 is a diagram for describing an overview of an object recognition system according to an embodiment of the present disclosure.

First, an overview of an object recognition system according to an embodiment of the present disclosure will be described with reference to FIG. 1. As illustrated in FIG. 1, the object recognition system according to the embodiment of the present disclosure includes a digital camera 1 and a server 3. The digital camera 1 includes a wireless communication function, and can be connected to the server 3 on a network 4 via a base station 5.

When a user captures a subject in the vicinity of the user, and a famous spot or a notable spot is present in the vicinity, it is usually difficult for the user to face a camera in the direction in which the famous spot is present or notice the spot, unless the user has known the presence.

Therefore, in the present embodiment, an object recognition system is proposed that can have a user notice, by providing a stimulus to a hand of the user, the presence of an object such as a famous spot and a notable spot that the user has not noticed.

More specifically, the digital camera 1 according to the present embodiment transmits, to the server 3, the current position information and the direction information (for example, information of the image capturing direction), and the server 3 determines, based on the current position information of the digital camera 1, whether an object is present in the vicinity of the digital camera 1.

Next, when it is determined that an object is present in the vicinity, the server 3 recognizes a relative relationship between the digital camera 1 and the object based on the direction information of the digital camera 1, and transmits the recognized relative relationship to the digital camera 1.

The digital camera 1 performs a process for having the user notice (recognize) the direction in which the object is present, based on the relative relationship received from the server 3.

Here, as illustrated in FIG. 1, a plurality of stimulation units 25A and 25B are disposed at parts of the digital camera 1 according to the present embodiment that are grasped by a user. The digital camera 1 controls the stimulation unit 25A disposed in the direction in which an object is present to provide a stimulus to a hand of the user, based on the relative relationship received from the server 3.

In this way, a stimulus provided to one of the hands that grasps the digital camera 1 allows the user to notice the presence of an object. The object recognition system according to the present embodiment can also guide a user's body such that the user naturally faces the digital camera 1 in response to the stimulus in the direction of the stimulus.

The object recognition system according to the present embodiment will be described in detail below. As illustrated in FIG. 1, the digital camera 1 is shown as an example of an electronic apparatus in the present embodiment, but an electronic apparatus according to the present embodiment is not limited thereto. For example, the apparatus may include a video camera, a smartphone including a camera, personal digital assistants (PDA), a personal computer (PC), a mobile phone, a portable music player, a portable image processing device, or a portable game device.

The electronic apparatus according to the present embodiment is not limited to a device equipped with a camera, and is also applicable to a device capable of acquiring the position information and the direction information of the device such as a device including, for example, a global positioning system (GPS) or a direction sensor. Additionally, the electronic apparatus according to the present embodiment is not limited to a device including a GPS or a direction sensor, and may also be a device into which the current position information or the direction information of the device can be manually input.

Further, the electronic apparatus according to the present embodiment may include a tactile device that has various shapes such as a sphere or an oval, and is capable of generating a stimulus.

2. BASIC CONFIGURATIONS

[2-1. Configuration of Digital Camera]

Figure 2:
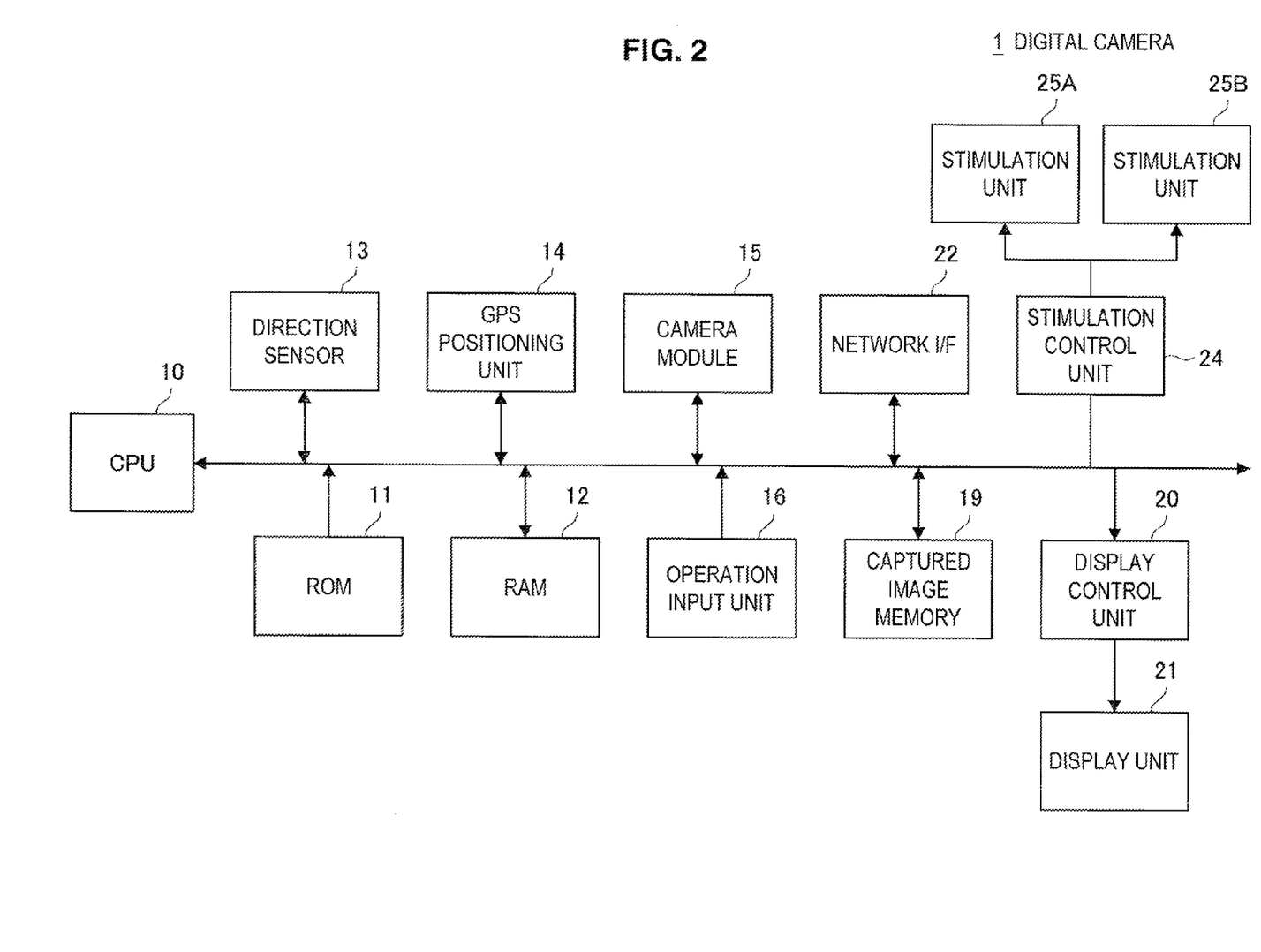
FIG. 2 is a block diagram illustrating a configuration of a digital camera according to the present embodiment.

FIG. 2 is a block diagram illustrating a configuration of the digital camera 1 according to the present embodiment. As illustrated in FIG. 2, the digital camera 1 includes a CPU 10, ROM 11, RAM 12, a direction sensor 13, a GPS positioning unit 14, a camera module 15, an operation input unit 16, captured image memory 19, a display control unit 20, a display unit 21, a network interface (I/F) 22, a stimulation control unit 24, and the stimulation units 25A and 25B. Each configuration will be described below.

The direction sensor 13 detects a direction of an optical axis of lens optical system of the camera module 15, that is, an image capturing direction, and outputs information (direction information) regarding the detected image capturing direction. The digital camera 1 including the camera module 15 is shown herein as an example of an electronic apparatus, but, as described above, an electronic apparatus according to the present embodiment is not limited to a device equipped with a camera. When an electronic apparatus that does not include a camera is used, the direction sensor 13 may output, as the direction information, the direction in which a particular part of the electronic apparatus faces.

The GPS positioning unit 14 receives a radio wave from a GPS satellite, detects the position at which the digital camera 1 is present, and outputs the detected position information. Additionally, the GPS positioning unit 14 is an example of a position information acquisition unit that detects the current position of the digital camera 1 based on an externally acquired signal. In addition, the position information acquisition unit may detect the position through WiFi, transmission to and reception from a mobile phone, a PHS, a smartphone, or the like, or near field communication, for example.

The camera module 15 includes an image sensor, an imaging optical system including an imaging lens, and a captured image signal processing unit, and outputs data of a captured image in the form of a digital signal. Additionally, the image sensor may be realized, for example, as a charge coupled device (CCD) imager or a complementary metal oxide semiconductor (CMOS) imager.

The operation input unit 16 is a shutter button, a zoom dial, a group of physical keys such as various types of switches, a touch panel obtained by being laminated on the display unit 21, or the like for detecting various types of operations performed by a user. The CPU 10 executes a process in response to a user operation input from the operation input unit 16 in accordance with a program stored in the ROM 11.

For example, flash memory such as card type memory is used for the captured image memory 19. The captured image memory 19 may also be a recording medium such as a digital versatile disc (DVD). Further, the captured image memory 19 does not have to be such a removable memory medium, and may also be a hard disc device.

The captured image memory 19 may also store, as captured images, images of a subject successively output from the camera module 15 in response to a timing at which a shutter button is operated.

The display control unit 20 performs display control on display contents of a display screen that is displayed on the display unit 21. The display contents of the display unit 21 includes, for example, an image (live view) of a subject output from the camera module 15 and a captured image stored in the captured image memory 19, in addition to a menu screen, various types of operation screens, or the like.

The display unit 21 is a display device that is realized, for example, as a liquid crystal display (LCD), an organic light-emitting diode (OLED), or the like.

The network I/F 22 is a communication module for transmitting data to and receiving data from an external device. For example, the network I/F 22 according to the present embodiment transmits, to the server 3 on the network, the current position information of the digital camera 1 measured by the GPS positioning unit 14 and the direction information output from the direction sensor 13. The network I/F 22 according to the present embodiment also receives, from the server 3, a recognition result of a relative relationship between the position of the digital camera 1 and the position of an object.

The stimulation control unit 24 controls the stimulation units 25A and 25B to have a user recognize the direction in which the object is present, based on the relative relationship between the position of the digital camera 1 and the position of the object, which is received from the server 3 via the network I/F 22. Specifically, the stimulation control unit 24 provides a stimulus (tactile stimulus, for example) to the user using the stimulation unit 25A or 25B disposed in the direction in which the object is present.

The stimulation control unit 24 may control stimulus intensity and/or a stimulus interval in accordance with a displacement between the direction in which the object is present and the image capturing direction of the digital camera 1. The digital camera 1 may control the stimulus intensity and/or the stimulus interval in accordance with the priority of the object.

Figure 3:
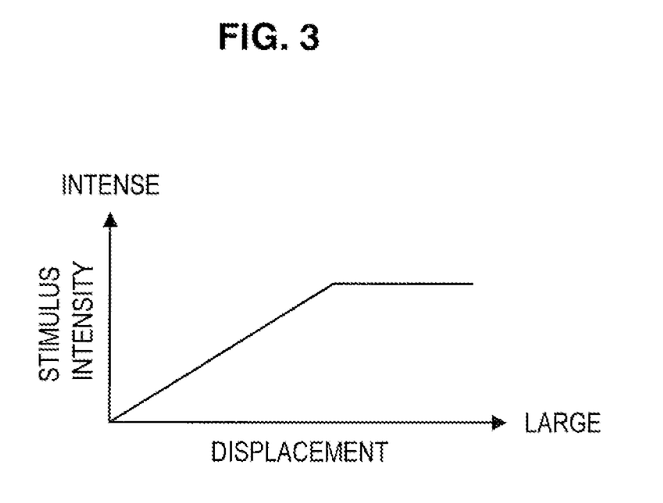
FIG. 3 is a block diagram illustrating a configuration of a server according to the present embodiment.

For example, as illustrated in FIG. 3, the stimulation control unit 24 may perform control such that the stimulus intensity increases with increase in the displacement. In the example illustrated in FIG. 3, the stimulus intensity in accordance with the displacement is controlled to be equal to or lower than a given value, taking an effect or the like on the body into consideration.

Figure 4:
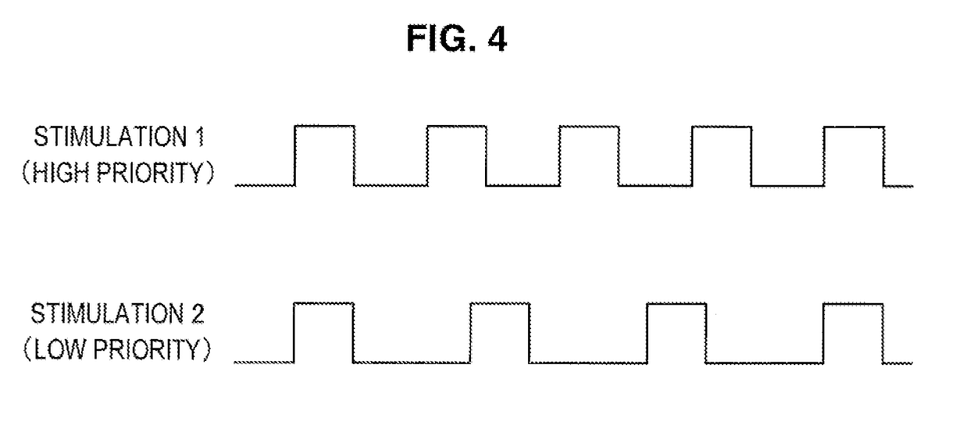
FIG. 4 is a diagram illustrating a relationship between stimulus intensity and a displacement.

As illustrated in FIG. 4, the stimulation control unit 24 may perform control such that stimuli (stimulation 1) are provided at shorter intervals as the priority of the object is higher, and stimuli (stimulation 2) are provided at longer intervals as the priority is lower. For example, when the priority of an object that is determined as an object present in the vicinity of the digital camera 1 by a determination unit 33 of the server 3 described below is low (the object is not such a famous spot, or the like), stimuli are provided at longer intervals than the intervals of the stimulation 1, as illustrated in the stimulation 2 of FIG. 4.

The stimulation control unit 24 may also perform control such that the stimulation is stopped when the orientation of the digital camera 1 is changed so the relative relationship is also changed, and the displacement between the direction in which the object is present and the image capturing direction of the digital camera 1 falls within a predetermined range.

The stimulation control unit 24 may perform control such that the stimulation is stopped when the orientation of the digital camera 1 is changed so the relative relationship is also changed, and the object enters the angle of view of the digital camera 1.

The stimulation units 25A and 25B are a plurality of sources of stimuli that provide stimuli to a hand (including a wrist and an arm) of the user that grasps the digital camera 1 in accordance with control performed by the stimulation control unit 24. It will be described below in what form the stimulation units 25A and 25B are specifically realized.

The CPU 10 executes the function of each configuration of the digital camera 1 described above by using a program or the like stored in the ROM 11.

In addition to a program for performing an image capturing function, the ROM 11 stores a program or the like for performing a stimulation control process to have a user recognize the direction of an object based on the relative relationship received from the server 3. The CPU 10 executes the programs stored in the ROM 11 using the RAM 12 as a work area.

The configuration of the digital camera 1 according to the first embodiment has been described in detail above. Next, a specific way of realizing the above-described stimulation units 25A and 25B will be described.

(Specific Example of Source of Stimuli)

A stimulus generated by each of the stimulation units 25A and 25B according to the present embodiment may include, for example, a vibration, an electrical stimulation, pressure, heat, control over the coefficient of friction of the housing, and control over the center of gravity of the housing. It will be specifically described below how each stimulus is realized.

Vibration

Figure 5:
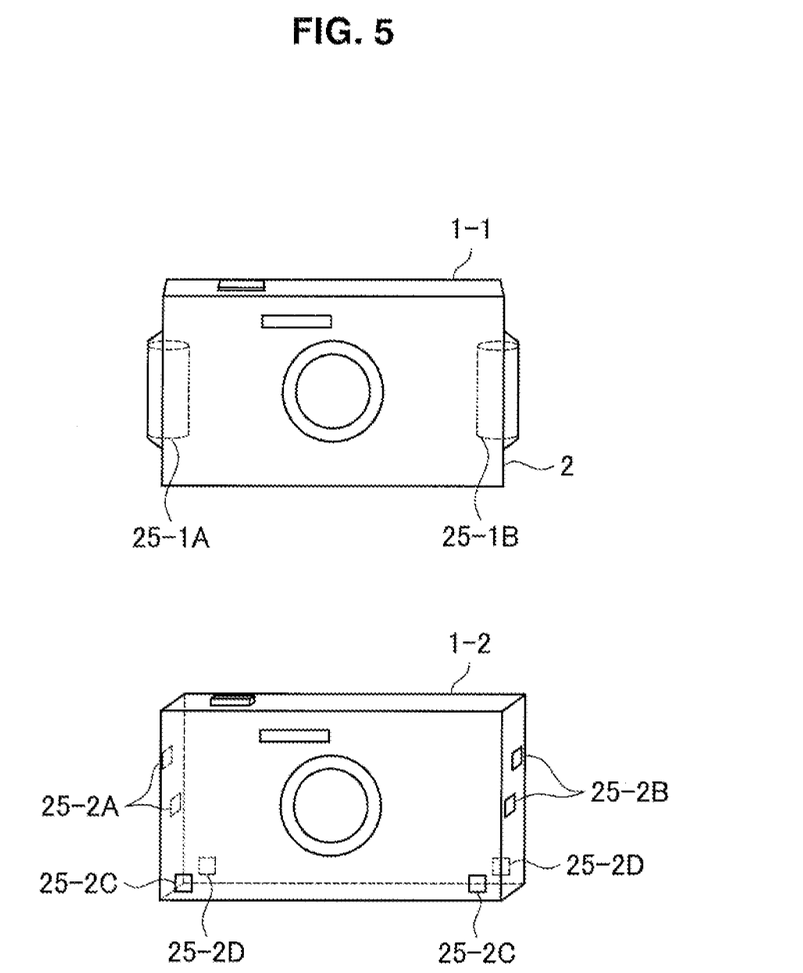
FIG. 5 is a diagram illustrating a stimulus interval according to priority of an object.

For example, an eccentric motor may be used as a way of applying a stimulus through a vibration. As illustrated in FIG. 5, a plurality of eccentric motors 25-1A and 25-1B are provided at both ends of a digital camera 1-1 that are grasped by the hands of a user. The stimulation control unit 24 operates the eccentric motor disposed in the direction in which an object is present.

As illustrated in FIG. 5, the digital camera 1-1 has an outer cover (housing) 2 having a shape that a part at each of the both ends that are grasped by a user protrudes. The eccentric motors 25-1A and 25-1B are disposed inside the protrusions of the outer cover 2, respectively. A cushioning material (not shown) may be provided on a side opposing to the outer cover 2 of each of the eccentric motors 25-1A and 25-1B so that it is possible to inform the user more accurately whether the right of the digital camera 1-1 is vibrating or the left of the digital camera 1-1 is vibrating.

Electrical Stimulus

For example, an electrode that applies an electric current through a body may be used as a way of applying a stimulus through an electrical stimulus. As illustrated in FIG. 5, a plurality of electrodes 25-2A to 25-2D are provided at both ends (both sides, and front and back surfaces) of a digital camera 1-2 that are grasped by the hands of a user. The stimulation control unit 24 performs control such that electric currents are applied from the electrodes disposed in the direction in which an object is present. An electric current applied to the hands of the user from each of electrodes 25-2 according to the present embodiment may be a pulse signal, which is apt to have an effect on the nervous system.

Pressure

Figure 6:
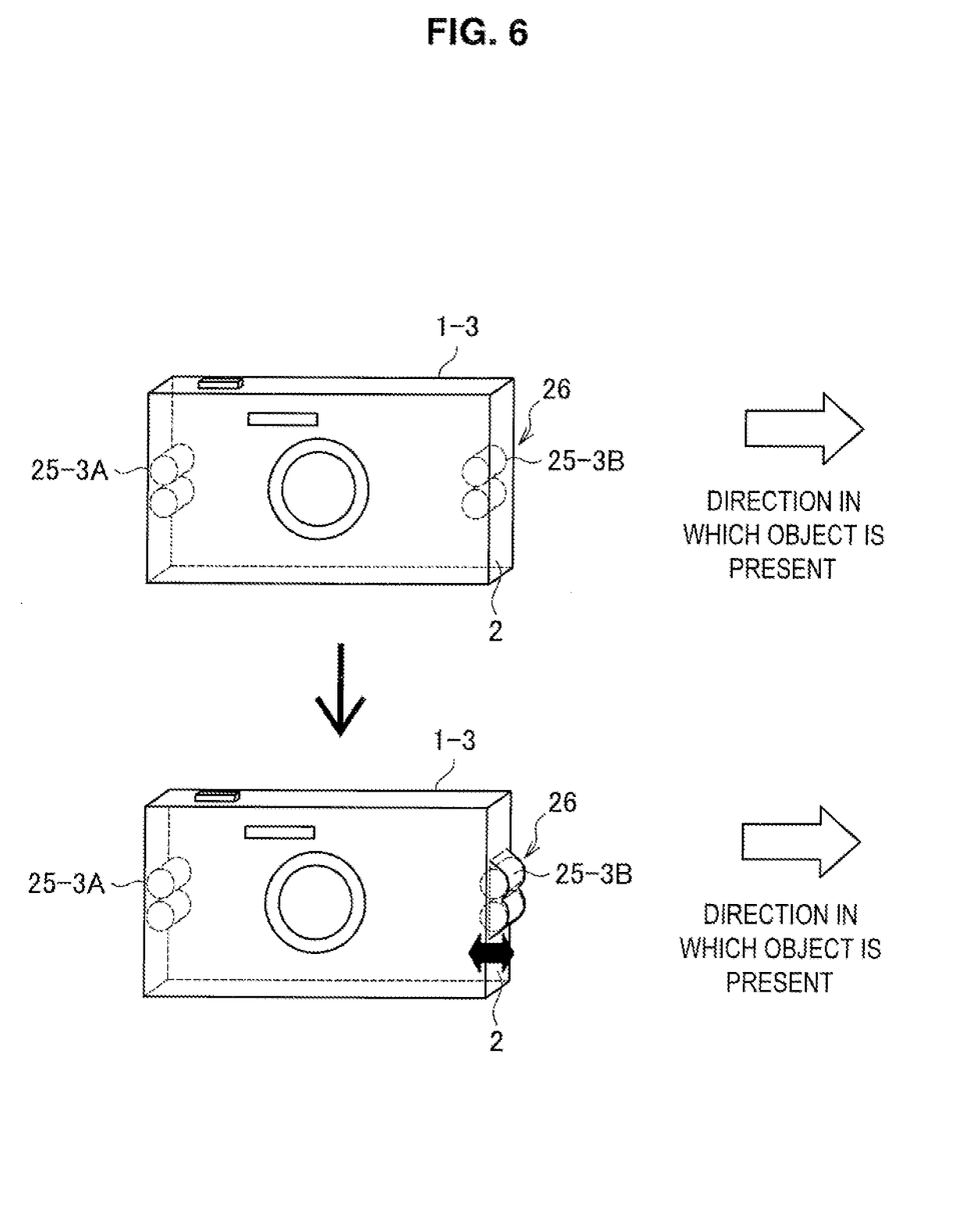
FIG. 6 is a diagram illustrating a specific example of a stimulus according to the present embodiment.

For example, the outer cover (housing) 2 of a digital camera 1-3 may be pressed from the inside so that the outer cover protrudes as a way of applying a stimulus through pressure. As illustrated in FIG. 6, for example, a plurality of pressing members 25-3A and 25-3B are operably provided at both longitudinal ends of the digital camera 1-3 that are grasped by a user. Here, at least a part of the both ends of the outer cover 2 of the digital camera 1-3 is formed of an elastic member and pressed from the inside by the pressing members 25-3A and 25-3B, thereby being deformable.

The stimulation control unit 24 performs operation control on the pressing member 25-3B disposed in the direction in which an object is present such that a part (protruding region 26) of the outer cover 2 formed of an elastic member is pressed from the inside as illustrated in the bottom of FIG. 6. One of the hands of the user that grasp both ends of the digital camera 1-3 is hereby pressed, and the user can recognize the direction in which an object is present.

The way of applying a stimulus through pressure is not limited to the above-described way of pressing. For example, when one end of a lace like member such as a strap is attached to the digital camera 1 in a retractable way, and the other end is rolled around a wrist of a user who grasps the digital camera 1, the digital camera 1 performs control for retracting the lace like member in accordance with the direction in which an object is present.

For example, when a user grasps the digital camera and captures an image with the lace like member rolled around a wrist, the lace like member is retracted as described above so that the wrist is retracted in the direction in which the object is present. The user hereby faces the digital camera 1 naturally in the direction in which the object is present and can notice the object. The lace like member according to the present embodiment may also be attached to both ends of the digital camera 1 and rolled around the respective wrists of a user. The digital camera 1 according to the present embodiment performs control for taking up the lace like member to retract the lace like member toward the digital camera 1.

Control Over Coefficient of Friction of Housing

For example, a coefficient of friction of the outer cover (housing) of the digital camera 1 may be controlled through the Squeeze effect using ultrasound as a way of applying a stimulus through control over a coefficient of friction. More specifically, micro electro mechanical systems (MEMS) devices including the function of controlling a coefficient of friction with ultrasound are provided at both longitudinal ends of the digital camera 1 that are grasped by a user.

The stimulation control unit 24 may control the MEMS device disposed in the direction in which an object is present to reduce a coefficient of friction in a part of the digital camera 1 that is grasped by a user and to make the part slippery. For example, when both ends of the digital camera 1 are grasped by the hands, and an image is captured, once one end of the digital camera 1 is slippery, the user prepares to carefully grip the slippery part so that the body is naturally inclined in the direction in which an object is present, and the user can notice the object.

Control Over Center of Gravity of Housing

For example, the center of gravity may be controlled using the gyroscopic moment as a way of applying a stimulus through control over the center of gravity.

The stimulation control unit 24 controls a gyroscope mounted on the digital camera 1 so as to change the center of gravity of the digital camera 1 in the direction in which an object is present. For example, when a user grasps the digital camera 1 with his/her hand and captures an image, once the center of gravity of the digital camera 1 is changed, the user can face the digital camera 1 in the direction in which the center of gravity has been changed (direction in which the user perceives a sense of force due to occurrence of the gyroscopic moment). In this way, once the center of gravity is changed, a user faces the digital camera 1, as retracted by the digital camera 1 itself, in the direction in which an object is present so that the user can notice the object.

Heat

For example, a heating member such as a Peltier element may be used as a way of applying a stimulus through heat. The stimulation control unit 24 controls a Peltier element provided in the digital camera 1 in the direction in which an object is present to generate heat so that the stimulation control unit 24 can have a user notice the direction in which the object is present.

[2-2. Configuration of Server]

Figure 7:
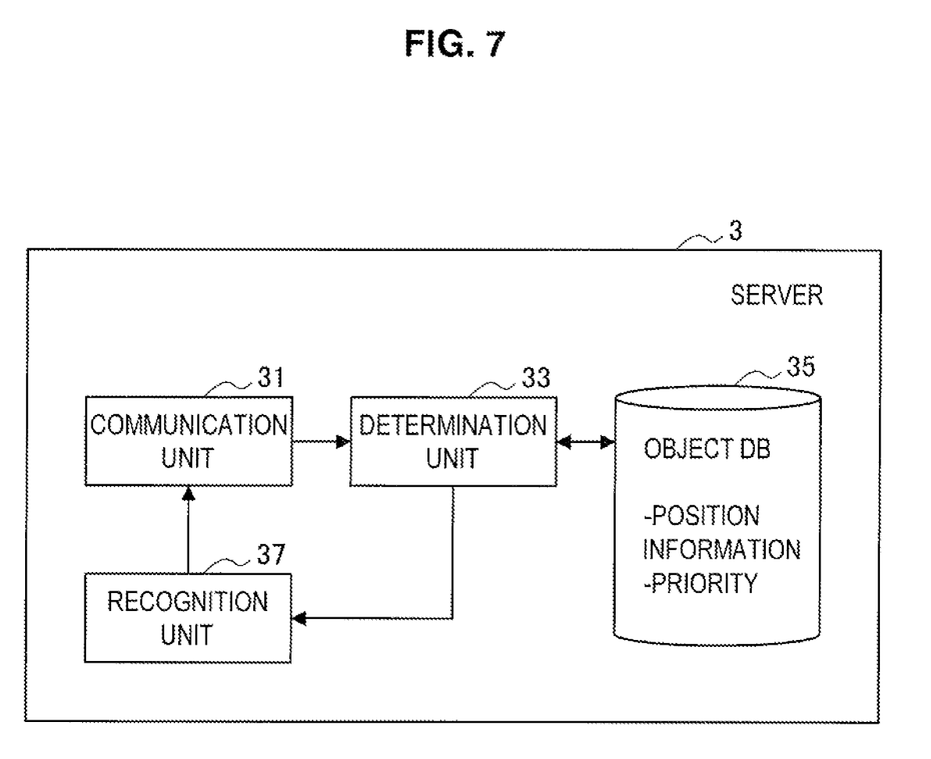
FIG. 7 is a diagram illustrating another specific example of a stimulus.

Next, a configuration of a server 3 according to the present embodiment will be described with reference to FIG. 7. FIG. 7 is a block diagram illustrating the configuration of the server 3 according to the present embodiment. As illustrated in FIG. 7, the server 3 includes a communication unit 31, a determination unit 33, an object DB 35, and a recognition unit 37.

The communication unit 31 is a communication module for transmitting data to and receiving data from an external device. For example, the communication unit 31 according to the present embodiment receives the current position information and the direction information (information indicating the image capturing direction) from the digital camera 1. The communication unit 31 also transmits a relative relationship between the position of the digital camera 1 and the position of an object to the digital camera 1 as a recognition result.

The determination unit 33 determines whether an object is present in the vicinity of the digital camera 1, and outputs the determination result to the recognition unit 37. More specifically, the determination unit 33 may, for example, compare the current position information of the digital camera 1 received from the digital camera 1 via the communication unit 31 with the position information of the objects stored in the object DB 35, and may determine an object present within a predetermined distance from the digital camera 1. When a plurality of objects are present within a predetermined distance from the digital camera 1, the determination unit 33 may also select one object in accordance with the priority of the objects stored in the object DB 35.

The object DB 35 is a storage unit storing an object including an artificial object and a natural object in association with the position information and the priority. More specifically, an object includes, for example, a sightseeing resort such as a famous spot and a notable spot. The priority of an object may be changed in accordance with the preference information of a user, the current position of a user, a date, time, weather, or the like.

When the determination unit 33 determines that an object is present in the vicinity of the digital camera 1, the recognition unit 37 recognizes a relative relationship between the position of the object and the position of the digital camera 1. The relative relationship recognized by the recognition unit 37 is transmitted from the communication unit 31 to the digital camera 1 as a recognition result.

A relative relationship of positions may be, for example, a displacement between the image capturing direction of the digital camera 1 and the direction in which an object is present. A displacement between the image capturing direction of the digital camera 1 and the direction in which an object is present will be specifically described below with reference to FIG. 8.

Figure 8:
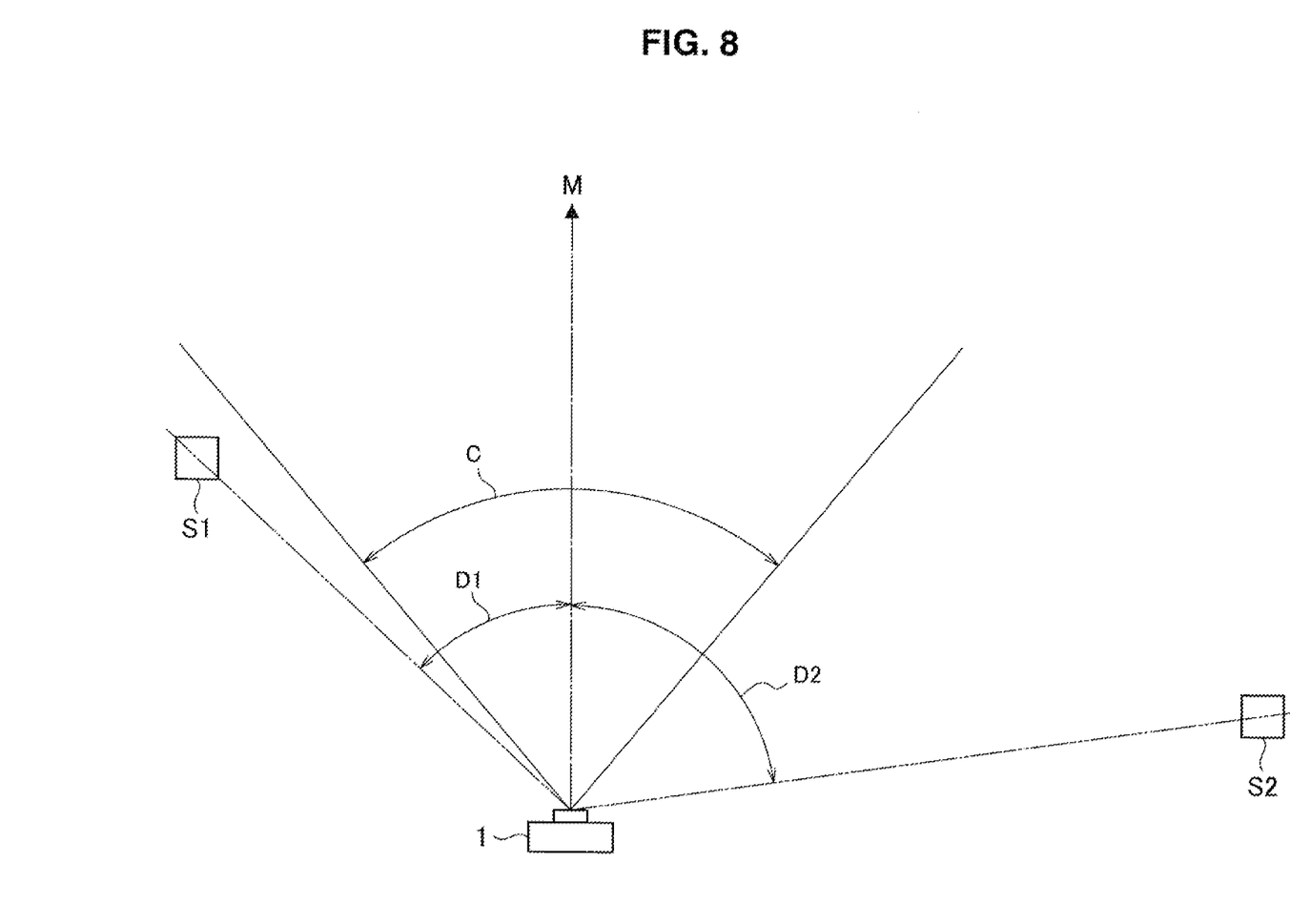
FIG. 8 is a diagram for describing a relative relationship between a current position of a digital camera and a position of an object.

FIG. 8 is a diagram illustrating a relationship between the current position of the digital camera 1 and the position of an object. The recognition unit 37 recognizes the arrangement of an object S with respect to the digital camera 1, as illustrated in FIG. 8, based on the position information of the object S.

The recognition unit 37 then recognizes a displacement D between an image capturing direction M of the digital camera 1 and a direction in which the object S is present. For example, in the example illustrated in FIG. 8, a displacement between an object S1 and the image capturing direction M of the digital camera 1 is a displacement D1. A displacement between an object S2 and the image capturing direction M of the digital camera 1 is a displacement D2. The displacement recognized by the recognition unit 37 in this way is transmitted from the communication unit 31 to the digital camera 1 as a recognition result.

When recognition unit 37 acquires information regarding an angle of view (for example, an image capturing parameter such as a zoom factor) from the digital camera 1 via the communication unit 31, the recognition unit 37 can recognize an angle of view C of the digital camera 1, as illustrated in FIG. 6. In such a case, the recognition unit 37 may recognize whether an object is included in the angle of view C, and when the object is not included in the angle of view C, the recognition unit 37 may recognize, as a displacement, a difference between the border of the angle of view C and the direction in which the object is present.

The basic configurations of the digital camera 1 and the server 3 according to the present embodiment have been described in detail above. Next, an operation process of an object recognition system according to the present embodiment will be described.

3. OPERATION PROCESS

Figure 9:
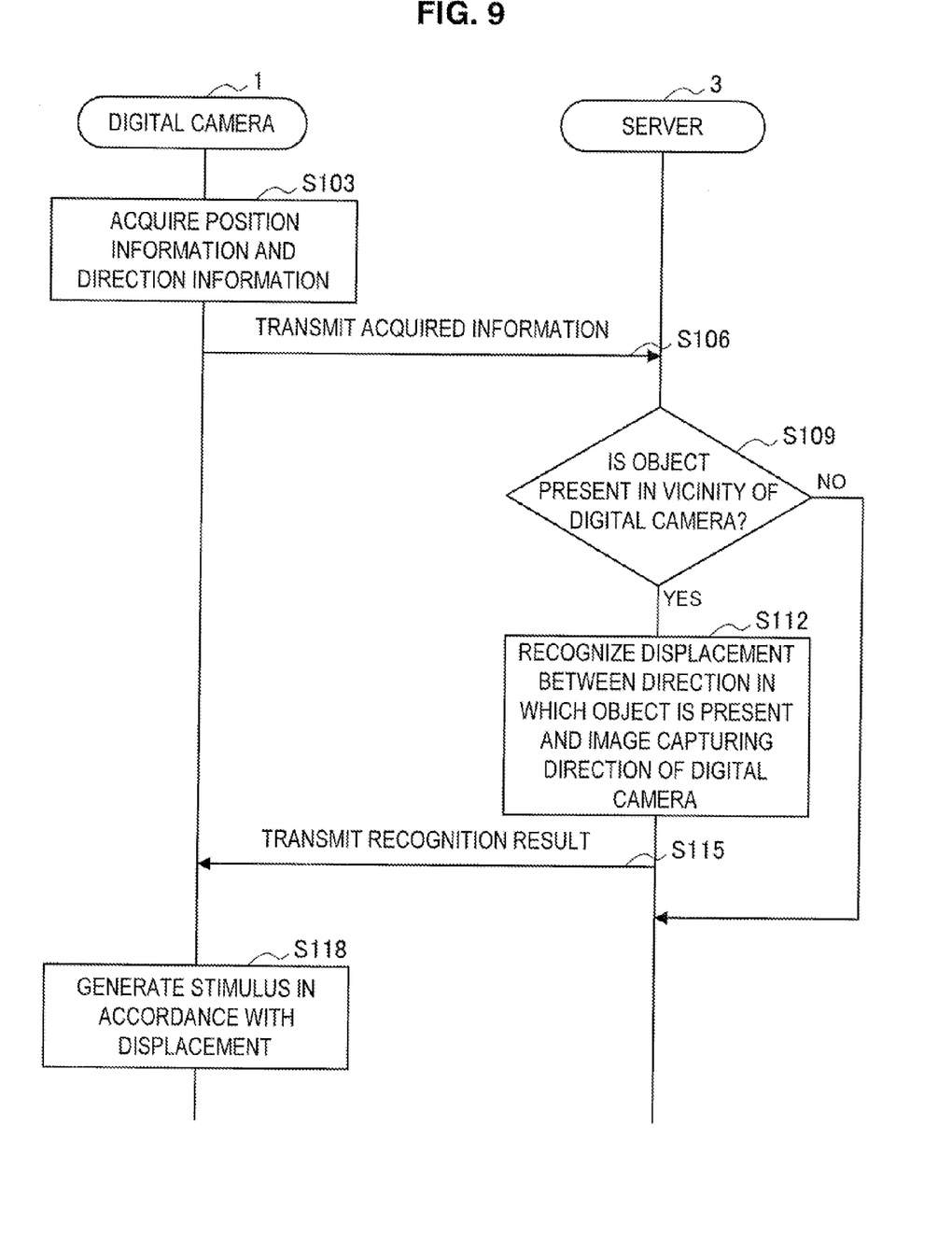
FIG. 9 is a flowchart illustrating an operation process of the object recognition system according to the present embodiment.

FIG. 9 is a flowchart illustrating an operation process according to the present embodiment. As illustrated in FIG. 9, first, in step S103, the CPU 10 acquires the current position information of the device (digital camera 1) from the GPS positioning unit 14, and also acquires information (direction information) indicating an image capturing direction from the direction sensor 13.

Subsequently, in step S106, the digital camera 1 transmits the acquired information (position information and direction information) to the server 3.

Next, in step S109, the determination unit 33 of the server 3 determines, based on the received current position information of the digital camera 1 and the position information of the objects stored in the object DB 35, whether an object is present in the vicinity of the digital camera 1.

Subsequently, when it is determined that an object is present, the recognition unit 37 recognizes, in step S112, a displacement between the direction in which the object is present and the image capturing direction of the digital camera 1.

Next, in step S115, the communication unit 31 transmits, to the digital camera 1, the recognition result (displacement) output from the recognition unit 37.

In step S118, the stimulation control unit 24 of the digital camera 1 generates a stimulus in accordance with the recognition result (displacement) received from the server 3 so as to have a user recognize the position of the object.

The operation process according to the present embodiment has been described above. Even when a relative relationship with an object is changed, the object recognition system according to the present embodiment can be applied by repeating steps S103 to S118 and having a user move the digital camera 1 in response to the stimulus.

As described above, when the digital camera 1 is moved by a user so that the relative relationship is changed, and an object enters the angle of view of the digital camera 1, or when the displacement falls within a predetermined range, the stimulation control unit 24 of the digital camera 1 may perform control such that stimulation is stopped.

3. CONCLUSION

As described above, if using the object recognition system according to the present embodiment, it is possible to have a user notice, by providing a stimulus to a hand of the user, the presence of an object such as a famous spot and a notable spot that has not been noticed by the user.

It should be understood by those skilled in the art that various modifications, combinations, sub-combinations and alterations may occur depending on design requirements and other factors insofar as they are within the scope of the appended claims or the equivalents thereof.

For example, the above-described displacement recognized by the recognition unit 37 is not limited to a horizontal displacement, and may include a displacement in a vertical direction, a diagonal direction, or a three dimensional direction.

In addition to a famous spot, a notable spot, a spiritual place, or the like, a recommended store may be included as a specific example of an object. For example, the recommended store may include a store on sale, a store offering X times more points, a refurbished store, a store with information indicating that a celebrity has visited the store.

An object may also be a preferred direction on one day based on Feng Shui. The determination unit 33 determines, based on the current position information of a user's electronic apparatus, a preferred direction for an object that is present in the vicinity of the electronic apparatus. The recognition unit 37 recognizes a displacement with the preferred direction. Then, the electronic apparatus can have a user recognize the preferred direction by generating a stimulus.

In the object recognition system according to the above-described embodiment, the digital camera 1 and the server 3 transmit data to and receive data from each other, but the object recognition system according to the embodiment of the present disclosure is not limited thereto. For example, all the processes may be performed in the digital camera 1. For example, the digital camera 1 may determine whether an object is present in the vicinity of the digital camera 1, and may further recognize a relative relationship between the position of the object and the position of the digital camera 1.

The server 3 according to the present embodiment may determine whether, in the vicinity of the digital camera 1, there is a position from which an object can be visually recognized, and may recognize a relative relationship between the position of the digital camera 1 and the position from which the object can be visually recognized. For example, when, in the vicinity of the digital camera 1, there is a point from which a famous spot can be seen between buildings, the server 3 recognizes a relative relationship between such a point and the position of the digital camera 1, and transmits the recognized relative relationship to the digital camera 1. Then, based on the recognized relative relationship, the digital camera 1 has a user recognize the direction of the position from which the object can be visually recognized.

In this way, the recognition system according to the embodiment of the present disclosure determines whether, in the vicinity of the digital camera 1, there is an object point (such as the above-mentioned position of an object, the above-mentioned position from which an object can be visually recognized, or a point on the way to a position from which an object can be visually recognized), and recognizes a relative relationship between the object point and the position of the digital camera 1. Then, if using the recognition system according to the embodiment of the present disclosure, it is possible to have a user recognize the direction of the object point (such as direction in which the object is present, and direction in which the object is visually recognized), based on the recognized relative relationship.

Additionally, the present technology may also be configured as below.

(1) A system including:
a housing configured to be grasped by a hand; a determination unit configured to determine whether an object point is present in a vicinity of an electronic apparatus;
a recognition unit configured to recognize a relative relationship between the object point and a position of the electronic apparatus when the determination unit has determined that the object point is present in the vicinity; and
a stimulation control unit configured to perform control in a manner that a stimulus is provided to a hand in accordance with the recognized relative relationship.

(2) The system according to (1),
wherein, when a plurality of object points are present, the determination unit identifies one object point in accordance with priority of each of the plurality of object points.

(3) The system according to (1) or (2),
wherein the stimulation control unit provides a stimulus to a hand in accordance with the recognized relative relationship in a manner that a direction of the object point is indicated.

(4) The system according to any one of (1) to (3),
wherein the stimulation control unit provides a stimulus through pressure, a vibration, an electrical stimulus, heat, control over a coefficient of friction of the housing, or control over a center of gravity of the housing.

(5) The system according to any one of (1) to (4),
wherein the stimulation control unit controls the housing to press the hand that grasps the housing in a direction of the object point.

(6) The system according to any one of (1) to (5), further including:
a lace like member that is attached to the electronic apparatus in a retractable way, and is grasped by a hand,
wherein the stimulation control unit performs control in a manner the lace like member is retracted in a direction of the object point.

(7) The system according to any one of (1) to (6),
wherein the electronic apparatus includes a plurality of vibrating units, and
wherein the stimulation control unit controls the plurality of vibrating units disposed in a direction of the object point to vibrate.

(8) The system according to any one of (1) to (7),
wherein the electronic apparatus includes a plurality of electrodes, and
wherein the stimulation control unit performs control in a manner that electric currents flow from the plurality of electrodes disposed in a direction of the object point.

(9) The system according to any one of (1) to (8),
wherein the stimulation control unit controls a coefficient of friction of the housing in a direction of the object point to be smaller than a coefficient of friction in another direction.

(10) The system according to any one of (1) to (9),
wherein the stimulation control unit performs control in a manner that a center of gravity of the electronic apparatus is inclined in a direction of the object point.

(11) The system according to any one of (1) to (10),
wherein the stimulation control unit controls intensity of the stimulus in accordance with a displacement between the position of the electronic apparatus and the object point that is based on the recognized relative relationship.

(12) The system according to (11),
wherein, when the relative relationship is changed, and the displacement falls within a predetermined range, the stimulation control unit performs control in a manner that stimulation is stopped.

(13) The system according to any one of (1) to (12),
wherein the stimulation control unit controls a stimulus occurrence interval in accordance with priority of the object point.

(14) The system according to any one of (1) to (13),
wherein, based on position information of the object point and current position information of the electronic apparatus, the determination unit determines whether the object point is present in the vicinity of the electronic apparatus.

(15) The system according to any one of (1) to (13),
wherein the electronic apparatus includes an imaging unit, and
wherein the stimulation control unit performs control in a manner that a stimulus is provided to a hand in accordance with a displacement between a direction of the object point and an image capturing direction of the electronic apparatus that is based on the recognized relative relationship.

(16) The system according to (15),
wherein the object point is a position of an object or a position from which the object is visually recognizable, and
wherein, when the relative relationship is changed, and the object enters an angle of view of the imaging unit, the stimulation control unit performs control in a manner that stimulation is stopped.

(17) An electronic apparatus including:
a housing configured to be grasped by a hand;
a reception unit configured to determine whether an object point is present in a vicinity of the electronic apparatus, and configured to receive, from a server that recognizes a relative relationship between the object point and a position of the electronic apparatus, the relative relationship recognized by the server when determined that the object point is present in the vicinity; and
a stimulation control unit configured to perform control in a manner that a stimulus is provided to a hand in accordance with the relative relationship received by the reception unit.

(18) A recording medium having a program recorded thereon, the program causing a computer to execute the processes of:
determining whether an object point is present in a vicinity of an electronic apparatus including a housing that is grasped by a hand;
receiving, from a server that recognizes a relative relationship between the object point and a position of the electronic apparatus, the relative relationship recognized by the server when determined that the object point is present in the vicinity; and
performing control in accordance with the received relative relationship in a manner that a stimulus is provided to a hand.

What is claimed is:
1. A system comprising:
a housing of a hand-held electronic apparatus configured to be grasped by a hand of a user;
a determination unit configured to determine whether an object point is present in a vicinity of the hand-held electronic apparatus that includes an imaging unit; and
a recognition unit configured to:
recognize an angle of view of the imaging unit, and
recognize a displacement between the angle of view of the imaging unit and a direction of the object point in the vicinity when the object point is not included in the angle of view; and a stimulation control unit of the hand-held electronic apparatus configured to perform control in a manner that a stimulus is provided to the hand in accordance with the recognized displacement in a manner that the direction of the object point is indicated.

2. The system according to claim 1,
wherein, when a plurality of object points are present, the determination unit identifies one object point in accordance with priority of each of the plurality of object points.

3. The system according to claim 1,
wherein the stimulation control unit provides the stimulus through pressure, a vibration, an electrical stimulus, heat, control over a coefficient of friction of the housing, or control over a center of gravity of the housing.

4. The system according to claim 1,
wherein the stimulation control unit controls the housing to press the hand that grasps the housing in the direction of the object point.

5. The system according to claim 1, further comprising:
a lace like member that is attached to the electronic apparatus in a retractable way, and is grasped by the hand,
wherein the stimulation control unit performs control in a manner that the lace like member is retracted in the direction of the object point.

6. The system according to claim 1,
wherein the electronic apparatus includes a plurality of vibrating units, and wherein the stimulation control unit controls the plurality of vibrating units disposed in the direction of the object point to vibrate.

7. The system according to claim 1,
wherein the electronic apparatus includes a plurality of electrodes, and wherein the stimulation control unit performs control in a manner that electric currents flow from the plurality of electrodes disposed in the direction of the object point.

8. The system according to claim 1,
wherein the stimulation control unit controls a coefficient of friction of the housing in the direction of the object point to be smaller than a coefficient of friction in another direction.

9. The system according to claim 1,
wherein the stimulation control unit performs control in a manner that a center of gravity of the electronic apparatus is inclined in the direction of the object point.

10. The system according to claim 1,
wherein the stimulation control unit controls intensity of the stimulus in accordance with the recognized displacement.

11. The system according to claim 10,
wherein, when the displacement falls within a predetermined range, the stimulation control unit performs control in a manner that stimulation is stopped.

12. The system according to claim 1,
wherein the stimulation control unit controls a stimulus occurrence interval in accordance with priority of the object point.

13. The system according to claim 1,
wherein, based on position information of the object point and current position information of the electronic apparatus, the determination unit determines whether the object point is present in the vicinity of the electronic apparatus.

14. The system according to claim 1,
wherein the stimulation control unit performs control in a manner that the stimulus is provided to the hand in accordance with the displacement between the direction of the object point and an image capturing direction of the electronic apparatus.

15. The system according to claim 14,
wherein the object point is a position of an object or a position from which the object is visually recognizable, and
wherein, when the object enters the angle of view of the imaging unit, the stimulation control unit performs control in a manner that stimulation is stopped.

16. An electronic apparatus comprising:
an imaging unit;
a housing configured to be grasped by a hand of a user;
a reception unit configured to determine whether an object point is present in a vicinity of the electronic apparatus, and configured to receive, from a server that recognizes an angle of view of the imaging unit and a displacement between the angle of view of the imaging unit and a direction of the object point in the vicinity when the object point is not included in the angle of view, the displacement recognized by the server; and
a stimulation control unit configured to perform control in a manner that a stimulus is provided to the hand in accordance with the displacement and the direction of the object point received by the reception unit.

17. A non-transitory computer-readable recording medium having stored thereon, a set of computer-executable instructions for causing a computer to execute the processes of:
determining whether an object point is present in a vicinity of an electronic apparatus that includes an imaging unit and a housing that is to be grasped by a hand of a user;
receiving, from a server that recognizes an angle of view of the imaging unit and a displacement between the angle of view of the imaging unit and a direction of the object point in the vicinity when the object point is not included in the angle of view, the displacement recognized by the server; and
performing control in accordance with the received displacement and the direction of the object point in a manner that a stimulus is provided to the hand.

* * * * *